(12) United States Patent
Jurkovic et al.

(10) Patent No.: US 9,943,140 B2
(45) Date of Patent: Apr. 17, 2018

(54) MATERIAL HANDLING SYSTEM FOR AUTOMATED PROCESSING OF SHOE PARTS

(71) Applicant: NIKE, Inc., Beaverton, OR (US)

(72) Inventors: Dragan Jurkovic, Beaverton, OR (US); Kuo-Hung Lee, Douliu (TW); Yen-Hsi Liu, Chiayi County (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/746,580

(22) Filed: Jun. 22, 2015

(65) Prior Publication Data

US 2016/0309850 A1    Oct. 27, 2016

Related U.S. Application Data

(60) Provisional application No. 62/151,304, filed on Apr. 22, 2015.

(51) Int. Cl.
| | | |
|---|---|---|
| *A43D 111/00* | (2006.01) | |
| *A43D 119/00* | (2006.01) | |
| *B25J 11/00* | (2006.01) | |
| *B25J 15/00* | (2006.01) | |

(52) U.S. Cl.
CPC ...... *A43D 111/003* (2013.01); *A43D 111/006* (2013.01); *A43D 119/00* (2013.01); *B25J 11/005* (2013.01); *B25J 15/0028* (2013.01); *Y10S 901/19* (2013.01); *Y10S 901/39* (2013.01)

(58) Field of Classification Search
CPC .............. A43D 111/00; A43D 111/003; A43D 111/006; A43D 2200/10; A43D 2200/20; A43D 2200/60

USPC .................................................. 12/1 A, 1 W
See application file for complete search history.

(56) References Cited

U.S. PATENT DOCUMENTS

| | | | |
|---|---|---|---|
| 3,388,412 A | | 6/1968 | Hanson et al. |
| 3,608,118 A | | 9/1971 | Rex, Jr. et al. |
| 4,155,135 A | * | 5/1979 | Becka .................. A43D 23/027 12/14.5 |
| 4,741,062 A | * | 5/1988 | Blanc ...................... A43D 3/02 12/1 A |

(Continued)

FOREIGN PATENT DOCUMENTS

| | | |
|---|---|---|
| FR | 2048794 A5 | 3/1971 |
| FR | 2586908 A1 | 3/1987 |

(Continued)

OTHER PUBLICATIONS

International Search Report and Written Opinion dated Jul. 7, 2016 for International Patent Application No. PCT/US2016/028938, 12 pages.

(Continued)

*Primary Examiner* — Ted Kavanaugh
(74) *Attorney, Agent, or Firm* — Shook, Hardy & Bacon L.L.P.

(57) ABSTRACT

Manufacturing of a shoe or a portion of a shoe is enhanced by executing various shoe-manufacturing processes in an automated manner. A material handling system suitable for use in an automated shoe-manufacturing process has a guide rail and first and second moveable holding elements, each of the holding elements having gripping elements for engaging a part or part stack during the manufacturing process.

20 Claims, 5 Drawing Sheets

(56) References Cited

U.S. PATENT DOCUMENTS

| | | | |
|---|---|---|---|
| 4,765,011 A | 8/1988 | Leeper | |
| 5,083,518 A * | 1/1992 | Ciucani | A43D 44/00 112/35 |
| 2001/0002232 A1 * | 5/2001 | Young | A43D 1/025 409/132 |
| 2013/0004289 A1 * | 1/2013 | Gaudette | B65G 47/904 414/807 |
| 2013/0127193 A1 | 5/2013 | Regan et al. | |
| 2013/0131853 A1 * | 5/2013 | Regan | G06T 7/74 700/114 |
| 2013/0131854 A1 * | 5/2013 | Regan | G06T 7/73 700/114 |
| 2015/0201710 A1 | 7/2015 | Jurkovic et al. | |
| 2015/0201711 A1 | 7/2015 | Jurkovic et al. | |

FOREIGN PATENT DOCUMENTS

| | | |
|---|---|---|
| FR | 2911255 A1 | 7/2008 |
| GB | 2255270 A | 11/1992 |
| TW | M533897 U | 12/2016 |

OTHER PUBLICATIONS

International Preliminary Report on Patentability dated Nov. 2, 2017 in International Patent Application No. PCT/US2016/028938, 8 pages.

\* cited by examiner

MATERIAL HANDLING SYSTEM FOR AUTOMATED PROCESSING OF SHOE PARTS

CROSS-REFERENCE TO RELATED APPLICATIONS

This application claims the benefit of U.S. Provisional Application No. 62/151,304, filed Apr. 22, 2015, which is hereby incorporated by reference in its entirety.

TECHNICAL FIELD

Aspects hereof relate to the automated manufacturing of shoes. More particularly, aspects relate to the assembly and stitching of parts of a shoe, for instance, shoe parts that collectively form all or part of a shoe upper, in an automated manner.

BACKGROUND

Manufacturing a shoe typically requires a number of assembly steps, such as cutting, forming, assembling, adhering, and/or stitching several shoe parts together. Some methods of completing these steps, such as those that rely heavily on manual execution, may be resource intensive and may have a high rate of variability. Automated assembly has been described, however, processes and machinery used to assemble other goods may be insufficient to assemble shoes, which present a variety of challenges for stitching and other joining processes. For example, shoe uppers may include thick, dense materials that are difficult to stitch uniformly, particularly for complex shapes. Further, shoe stitching requires a relatively high degree of precision, both to maintain predictable fit and to ensure that both shoes in a pair match.

Shoe uppers may include stitching that is functional, aesthetic, or both, and failure to achieve a high degree of accuracy in the placement and uniformity of the stitching may make the shoes prone to premature failure or aesthetically unacceptable. Uniformity is desired within a given part, but also part-to-part, e.g., to make sure that decorative stitching is consistent on both shoes in a pair of shoes. Of course, functional stitching should also be uniform, e.g., to ensure that the shoe upper does not separate from the sole or tongue of the shoe, and to ensure that any separate parts of the shoe upper do not unintentionally separate from one another. At the same time, the materials used to construct a shoe upper may be susceptible to marring, abrasion, or other damage from automated equipment used to assemble goods that are highly durable or are not valued significantly for aesthetics, such as nautical tarps. Damage to the shoe upper material may be aesthetically unacceptable, or may interfere with functional properties of the shoe upper, such as permeability to moisture.

There remains a need for automated shoe assembly systems, processes, and methods which improve on the accuracy and precision of the assembly, particularly, stitching processes during assembly.

SUMMARY

This Summary provides a high-level overview of the disclosure and introduces a selection of concepts that are further described in the Detailed Description below. This Summary is not intended to identify key features or essential features of the claimed subject matter, nor is it intended to be used as an aid in isolation to determine the scope of the claimed subject matter.

In brief and at a high level, this disclosure describes, among other things, assembly and joining, e.g., by stitching, of parts of a shoe in an automated fashion. An exemplary system that assembles and stitches shoe parts in an automated fashion may be comprised of various components, such as manufacturing stations, conveyance mechanisms, vision systems and a shared control system. Exemplary systems and system components are described, for example, in U.S. patent application Ser. No. 14/162,271 and U.S. patent application Ser. No. 14/162,275, each filed on Jan. 23, 2014, which are hereby incorporated by reference in their entireties.

For example, individual shoe parts (e.g., shoe parts that collectively form all or part of a shoe upper assembly) may be retrieved and temporarily assembled at a stacking station according to preset relative positions to form part stacks. The parts and/or part stacks may be retrieved with the relative positioning of the shoe parts being maintained and placed at a stitching machine for more permanent attachment via stitching of the parts to form a shoe assembly and/or decorative stitching. The retrieval device may include, or may deliver the part or part stack to, a material handling system. A material handling system may engage the part or part stack before, as, or after the part or part stack is placed at a stitching machine. The material handling system may remain engaged with the part or part stacks during all or a portion of the stitching process.

In some portions of the assembly and joining process, it may be acceptable to hold or move parts using methods such as static attachment, reduced air pressure (i.e., "vacuum"), other air displacement techniques, centrifugal force, or the like, that can maintain the position of the parts relative to the equipment and/or each other. At various manufacturing stations, conveyance processes, and/or visual inspection points, it may be desirable to grip the part or part stacks in a manner that provides more direct control over the tension and/or position of the part. As an example, during stitching or other joining operations, the parts may be physically pulled, pushed or otherwise manipulated in a way that could cause undesirable repositioning or re-tensioning of the part or part stack. For example, during stitching, a part or part stack may tend to move, gather, pull, or fold back on itself, as a result of the forces applied by the stitching needle and/or stitching thread. If this tendency does not manifest in substantially the same way part-to-part, this can be a source of variation in the integrity, placement, or appearance of the stitches.

An exemplary material handling system may comprise a guide rail. The guide rail may have a first end and a second end. A first holding element may be positioned moveably in a path along a first portion of the guide rail. The first holding element may be moveable along a first holding element path. The path of the first holding element may extend between the first and second ends of the guide rail. The first portion of the guide rail may extend from a midpoint of the guide rail to the first end of the guide rail. A second holding element may be positioned moveably in a path along a second portion of the guide rail. The second holding element may be moveable along a second holding element path. The path of the second holding element may extend between the first and second ends of the guide rail. The second portion of the guide rail may extend from a midpoint of the guide rail to the second end of the guide rail.

Each holding element may comprise a first gripping element and an opposing, second gripping element. The first gripping element may be moveable relative to the second gripping element, or the second gripping element may be moveable relative to the first gripping element, or both the first gripping element and the second gripping element may be moveable relative to one another.

A multi-axis robotic arm may be coupled with the guide rail. The multi-axis robotic arm may move the material handling system as a unit. The material handling system may comprise a drive mechanism for moving the first holding element. The drive mechanism may be mechanically engaged with the first holding element. The drive mechanism may be effective to move the first holding element along the first holding element path. A second drive mechanism may be mechanically engaged with the second holding element. The second drive mechanism may be effective to move the second holding element along the second holding element path. The first and/or second drive mechanisms may be an electric actuator, a pneumatic actuator, a hydraulic actuator, or a belt drive.

The first holding element path may be a mirror image of the second holding element path. Either or both paths may be linear. The movement of the first and/or second gripping element of the first holding element may be orthogonal to the first holding element path. The movement of the first and/or second gripping element of the second holding element (the third and/or fourth gripping elements of the material handling system as a unit) may be orthogonal to the second holding element path.

A system for manufacturing shoe parts in an automated manner may comprise a manufacturing station and a material handling system. The system may further comprise a vision inspection system.

A method for manufacturing a shoe may comprise engaging a part or part stack using a material handling system. Engaging a part or part stack may comprise securing the part or part stack with a first holding element and a second holding element. Engaging the part or part stack may further comprise moving the first holding element away from the second holding element after the part or part stack has been secured. The method may comprise performing an assembly operation on the part or part stack at a manufacturing station. The method may comprise disengaging the part or part stack from the material handling system. The assembly operation may comprise one or more of riveting, adhesive bonding, cohesive bonding, welding, stapling, or stitching. The method may comprise visually inspecting the part or part stack. The part or part stack may be visually inspected after the assembly operation. The material handling system may be engaged with the part or part stack while the part or part stack is visually inspected. The method may comprise moving the part or part stack to a second manufacturing station. The material handling system may remain engaged with the part or part stack while the part or part stack is moved to a second manufacturing station.

BRIEF DESCRIPTION OF THE DRAWINGS

Illustrative aspects of the present disclosure are described in detail below with reference to the attached drawing figures, which are incorporated by reference herein, and wherein.

DETAILED DESCRIPTION

This subject matter is described with specificity to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

This disclosure relates to the automated assembly and stitching of shoe parts, and, in particular, to a material handling system for use in an apparatus or system for the assembly and stitching of shoe parts. As mentioned above, a system that assembles and stitches shoe parts in an automated fashion may be comprised of various components, such as manufacturing stations, conveyance mechanisms, vision systems, and a shared control system. A material handling system or a series of material handling systems may be useful with any of these subcomponents, especially, but not exclusively, manufacturing stations that cut, form, and/or join parts of shoes. A material handling system may form part of a conveyance mechanism, maintaining engagement with a part or part stack at and/or between one or more manufacturing stations. A material handling system may be associated with a particular manufacturing station, engaging a part or part stack for a single manufacturing operation or step. A material handling system may engage a part or part stack during all or a portion of any manufacturing or conveyance step, or may engage during a portion of a manufacturing or conveyance step, disengage during a portion of the manufacturing or conveyance step, and re-engage during a portion of the same manufacturing or conveying step. For the purpose of this disclosure, a discrete manufacturing step ends when a particular task has been accomplished (e.g., cutting out a part from a larger piece of material, assembling a part stack, or stitching a part or part stack), and a discrete conveying step ends when a conveying system delivers a part or part stack (including an upper shoe assembly or assembled shoe) to a new piece of equipment, without regard to whether the conveyance mechanism disengages completely from the part or part stack at any particular piece of equipment.

A material handling system may be particularly, but not exclusively, useful in manufacturing operations involving stitching or other joining methods (e.g., riveting; adhesive or cohesive bonding; welding by heat, ultrasound or other means; stapling; etc.). In such operations, it is often important to maintain the position of and/or tension in the part or part stack, and the operation itself may tend to induce movement or changes in tension in the part or part stack.

Figure 1:
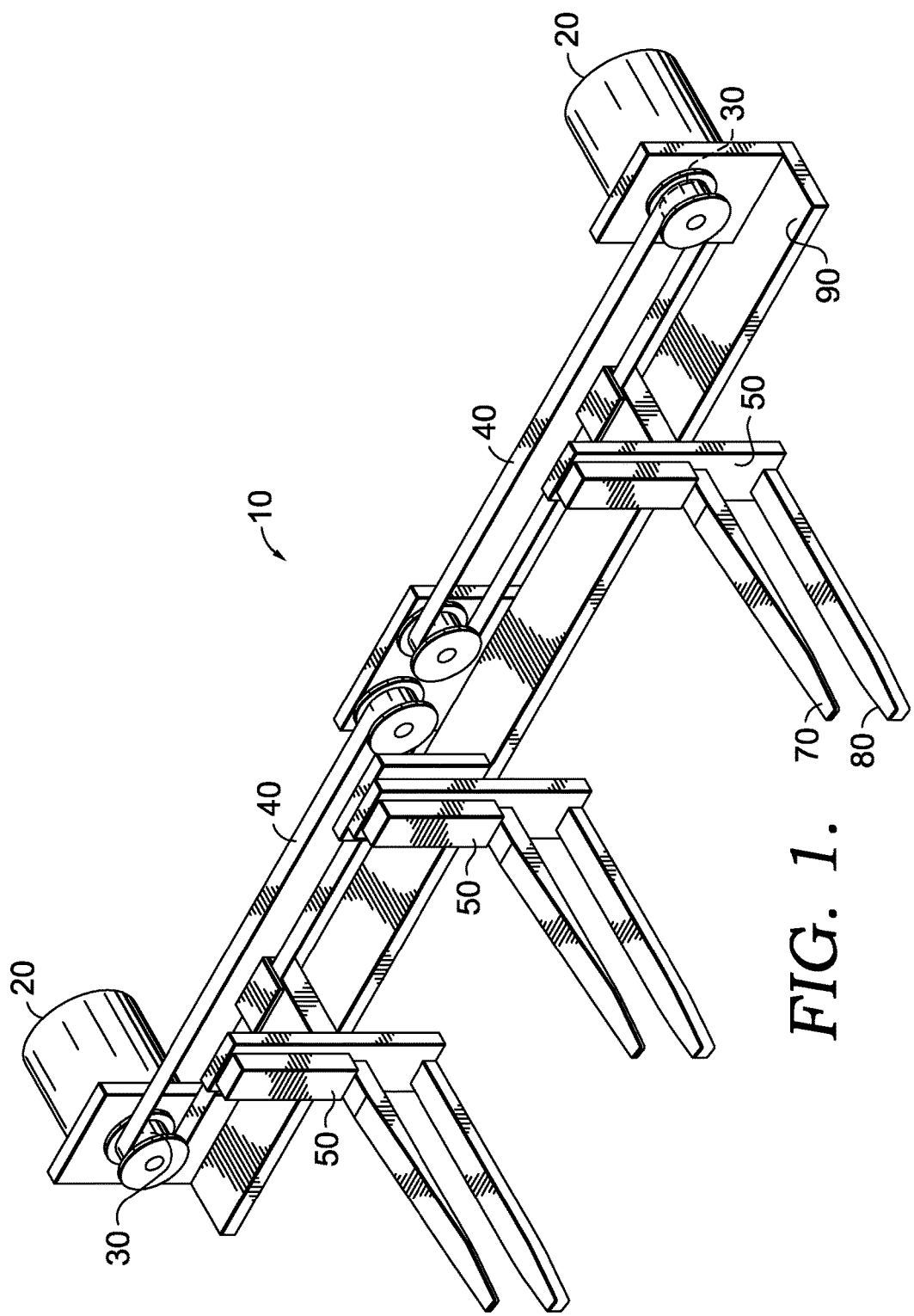
FIG. 1 is a perspective view of an exemplary material handling system suitable for use in a system for assembling and stitching shoe parts in an automated manner.
Figure 2:
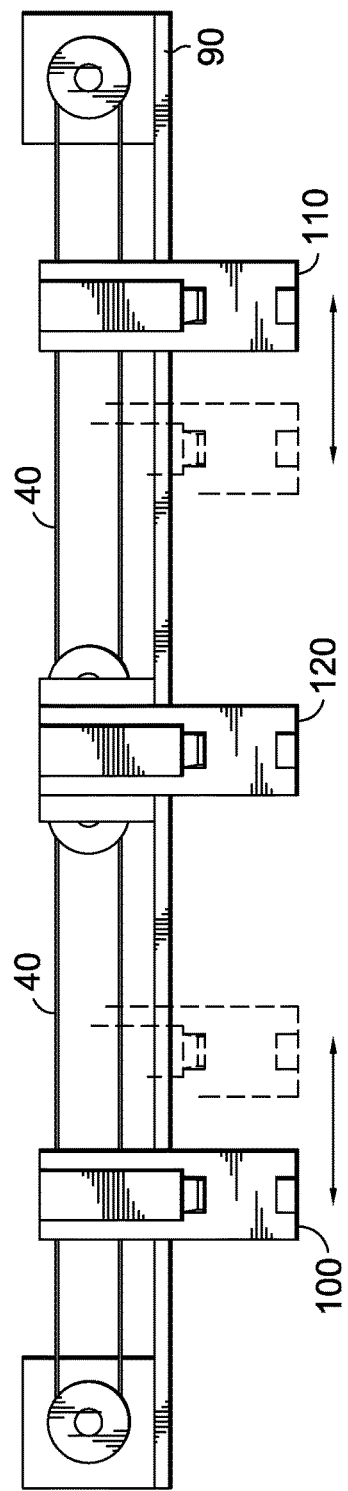
FIG. 2 is a side view of an exemplary system material handling system suitable for use in a system for assembling and stitching shoe parts in an automated manner.
Figure 8:
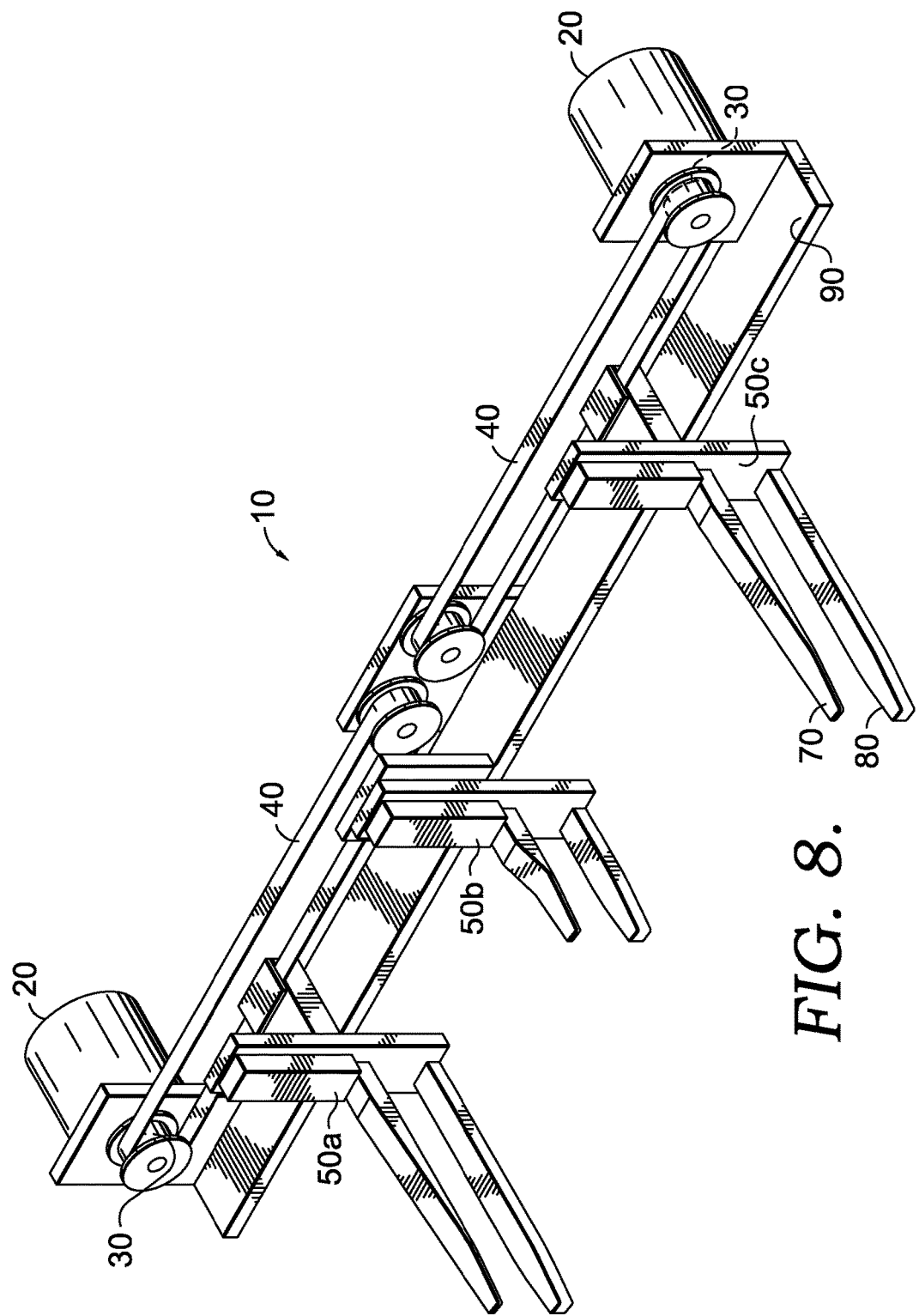
FIG. 8 is a perspective view of an exemplary material handling system suitable for use in a system for assembling and stitching shoe parts in an automated manner.

FIG. 1 depicts an exemplary, non-limiting material handling system 10. As shown, material handling system 10 comprises two stepping motors 20. Stepping motors 20 are each connected to a spindle 30, and spindles 30 are each connected to a drive belt 40. Positioned moveably along drive belt 40 are holding elements 50, the holding elements 50 having gripping arms 60. As shown, there are two holding elements 50 on one of the drive belts, however, in some embodiments each holding element may be positioned along a separate drive belt, or one or more holding elements may be fixed to material handling system 10 without connection to a drive belt, as shown in FIG. 2. Also as shown, the holding elements 50 each have two gripping arms 60, an upper arm 70 and a lower arm 80. The gripping arms may be pronged (as a fork or trident) in two, or three, or more parts. The gripping arms 60 are shown as similar in size and configuration, however, the gripping arms 60 associated with a particular holding element 50 could be different. As an example, upper arm 70 might have two prongs and lower arm 80 might have one prong. As an alternate example, upper arm 70 might have one prong and lower arm 80 might have two prongs. As another example, the lengths of upper arm 70 and lower arm 80 might be different. Where the upper and lower arms are asymmetric, they may be centered or off-center relative to one another. Different holding elements 50 might have different gripping arm configurations. For example, one holding element may have shorter gripping arms than the other holding elements. As shown in FIG. 8, a middle holding element 50b has shorter gripping arms than outer holding elements 50a and 50c. Alternately, holding element 50a could have shorter arms than holding elements 50b and 50c, or holding element 50c could have gripping arms shorter than the other holding elements, or one holding element could have longer gripping arms than the other holding elements, or all three holding elements could have gripping arms of different lengths.

Returning to FIG. 1, three holding elements 50 are shown, however, three holding elements 50 are not essential. Two holding elements 50 may perform suitably, and more than three holding elements 50 may be used if desired. The number of holding elements 50 and the gripping arm configurations that are useful in a given application may depend, for example, on the size of the part or part stack, the operation or operations to be performed on the part or part stack, and the location or path of the operation or operations to be performed on the part or part stack. For example, different numbers and/or configurations of holding elements may permit different stitching paths for a particular part or part stack. Stated differently, a varied number of holding elements and/or varied lengths of gripping arms may be implemented in aspects to accommodate specific operations (e.g., stitching, welding, adhering, and cutting) that would be interfered with or cause the operation to be less efficient by an interfering holding element and/or gripping arm. Therefore, if a tool path or other operation path would be obscured or otherwise interfered with by a component, it is contemplated that one or more of the components are altered, removed, or re-positioned, to eliminate the potential interference, in exemplary aspects.

As shown in FIG. 1, stepping motors 20, spindles 30, drive belts 40, and holding elements 50 are all attached, directly or indirectly, to guide rail 90. In alternate embodiments, each holding element or a subcombination of holding elements might be attached to a separate rail or rails, or to alternative supports, such as robotic arms, vertical plates, or the like. Guide rail 90, as shown, is generally linear and planar, however, it may be desirable to provide a curved and/or non-planar guide rail for one, or at least one, or all of the holding elements in a particular material handling system.

As shown in FIG. 2, drive belts 40 can move to reposition holding elements 100 and 110 relative to one another. Drive belts 40 are used with stepping motors (not shown in FIG. 2) to reposition holding elements 100 and 110. Any suitable drive mechanism can be used, including, without limitation, an electric actuator, a pneumatic actuator, a hydraulic actuator, a belt drive, or combinations thereof. As shown in FIG. 2, the two laterally outmost (relative to the midpoint of guide rail 90) holding elements 100, 110 of a set of three holding elements each move roughly equal distances in opposing directions along the same axis. The first holding element 100 moves outward in a first holding element path, toward a first lateral end of guide rail 90, and could be moved in a second direction inward to or even beyond its initial starting position, along the first holding element path or along an alternative path. The second holding element 110 moves outward in a second holding element path, toward a second lateral end of guide rail 90, and could be moved in a second direction inward to or even beyond its initial starting position, along the second holding element path or along an alternative path. As shown, central holding element 120 is fixed. However, if desired, holding element 120 could be connected to a drive mechanism, either a drive mechanism unique to holding element 120 or to a drive mechanism shared with another holding element, such as holding element 100 or holding 110. Holding element 120, as the third holding element in material handling system 10, could move independent of one or both of holding elements 100, 110, or could move in coordination with one or more other holding elements (e.g., along generally the same path, although perhaps not to the same extent).

The movement of the holding elements that move may be approximately equal in absolute distance from the starting position, before the holding elements engage a part or part stack, and/or the midpoint of guide rail 90. The holding elements may be driven by separate motors under independent control, allowing for symmetric or asymmetric movement of the holding elements. For example, holding element 110 might move more or less than holding element 130. In some circumstances, it may be desirable to change the position of one or more holding elements during a manufacturing operation, e.g., to change the position of or tension in only a portion of a part or part stack during the operation. The position of the holding element(s) may be pre-determined or may be adjusted during operation, e.g., for each individual part or part stack, or for a series of parts or part stacks. For example, the holding element(s) may have fixed starting and ending positions for a given type of shoe. Alternately, the position of the holding elements may be calculated for a given part or series of parts based on, for example, visual observations from a human operator or visual control system. The holding element movement required to achieve the desired position or tension in the part or part stack may be very small, even unnoticeable to the unaided eye in some circumstances. In some aspects, the movement of the holding elements may be greater than 0 mm and less than 2 mm, or between 0.5 mm and 1 mm inclusive of the endpoints. In another non-limiting alternative, the position of the holding elements may be adjusted to apply a specified force to the part or part stack or to achieve a specified tension in the part or part stack. If desired, the material handling system may be equipped with a force measuring device (such as a spring or load cell) to evaluate the force applied to or tension within a part or part stack. A force measuring device could be associated, for example, with motors 20 and/or with the arms of holding element 50. Stated differently, the movement of holding elements 50 may be controlled based on the distance moved by one or more of holding elements 50, or the movement of holding elements 50 may be controlled based on the tension generated by the movement of the holding element(s).

As shown in FIG. 2, the movement of the holding element(s) may be linear, and/or may be linear in a lateral plane. Vertical and/or multi-axis movement is also contemplated, and different holding elements may move in different paths and/or planes. In some embodiments, two or more holding elements may move in the same direction or generally in the same direction. Although three holding elements are shown and described, any desirable number of grippers greater than or equal to two may be used. The initial and in-process spacing of the holding elements may be, but does not need to be, equidistant, symmetrical, and/or centered relative to guide rail 90 or other machinery, and may be adjusted to suit the particular parts, processes, and equipment in use. In some embodiments, it may be desirable for the holding elements to be unequally spaced from one another, before, during, or after engaging a part or part stack. If more than two holding elements are used, the additional holding element(s) may be mobile or fixed, and may be positioned between or outside the other holding elements.

Figure 4:
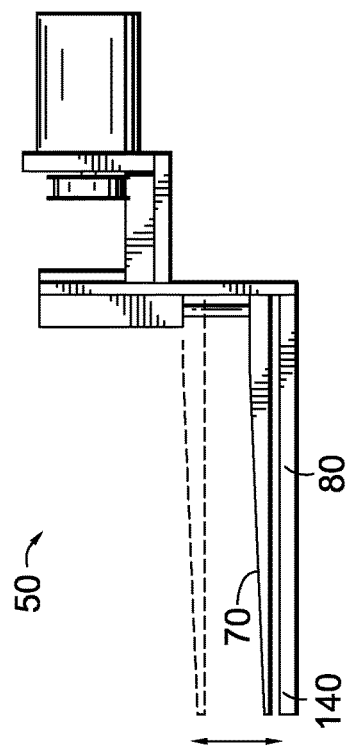
FIG. 4 is a side view of the exemplary holding element of FIG. 3, showing exemplary movement of the gripping arms.
Figure 3:
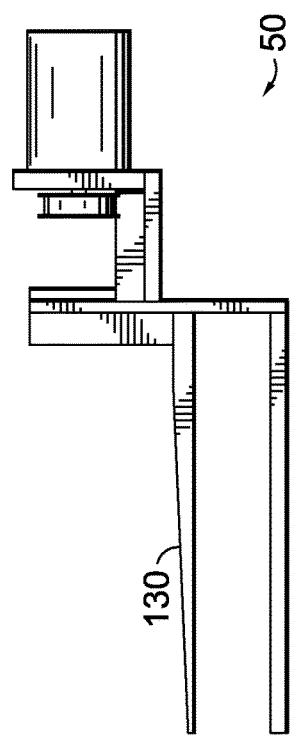
FIG. 3 is a side view of an exemplary holding element of a system such as those depicted in FIGS. 1 and 2.

FIGS. 3 and 4 show a side view of holding element 50. Holding element 50 has part-contact surfaces which are planar and symmetrical. If desired, holding element 50 may be equipped with textured surfaces having, for example, ridges, raised or lowered areas of any shape or distribution, or teeth to help grasp a part or part stack. If holding element 50 is textured, the texture may correspond to features of the part or part stack. Holding element 50 may have an open position 130 and a closed position 140. In some embodiments, it may be desirable to adjust closed position 140 during an operation, e.g., to permit limited repositioning or re-tensioning of a part or part stack. It may be desirable to reposition or re-tension a part or part stack, for example, if visual observation identifies a misalignment. FIG. 4 suggests that closed position 140 is achieved by lowering upper arm 70, however, lower arm 80 could be raised to meet upper arm 70, or both arms could move toward center to achieve closed position 140. If both arms move, the arms may move similar distances to a center point between the arms, or one arm may move further than the other arm. For example, upper arm 70 may be lowered toward lower arm 80, and lower arm 80 may move very slightly upward to meet upper arm 70. Upper arm 70 or lower arm 80 may remain stationary as the other arm closes around the part or part stack. As discussed above, different holding elements may be positioned or configured in the same or different manners, as to initial and in-process positions, size, shape, mobility, texture, and etc. As an example, lower arm 80 may have a rectangular profile, and/or lower arm 80 may have a flat bottom. A flat bottom on lower arm 80 may help achieve a consistent clearance distance from the work surface, such as horizontal support 190 (shown in FIG. 5).

Figure 5:
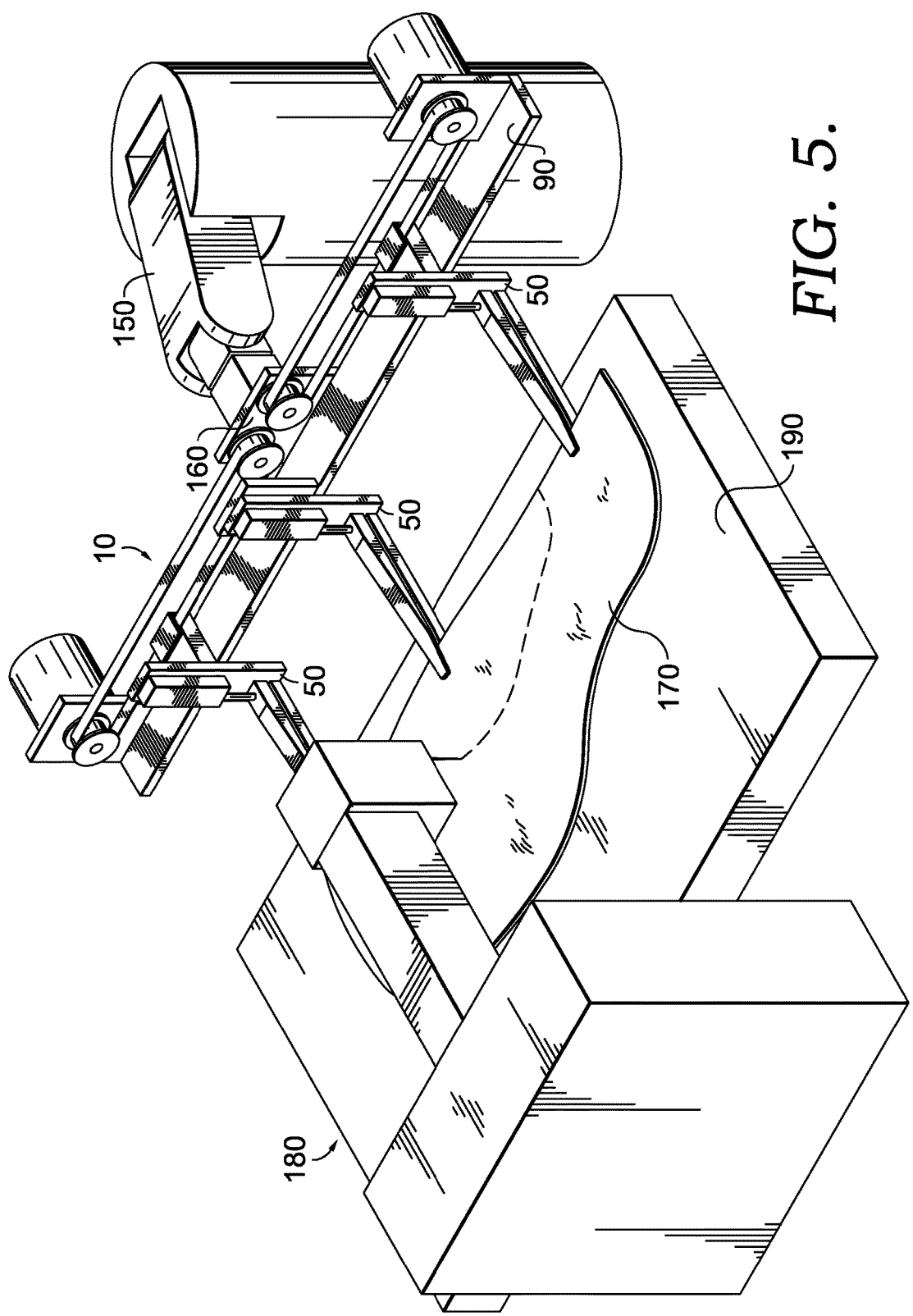
FIG. 5 is a perspective view of the exemplary material handling system of FIG. 1 in relation to an exemplary manufacturing station.

FIG. 5 shows an exemplary material handling system 10 in an exemplary context, with a multi-axis robotic arm 150 connected via an intermediate plate 160 to guide rail 90. A series of three holding elements 50 are each engaged with part 170 at manufacturing station 180. As shown in FIG. 5, manufacturing station 180 may include horizontal support 190. Horizontal support 190 may support the manufacturing or conveyance operation and/or may help maintain the position of part 170. In some embodiments, horizontal support 190 may be configured to contact the bottom of lower arm 80 of one or more holding element 50. In this configuration, horizontal support 190 can reduce the functional effect of any undesired rotation of holding element 50 about a lateral axis and/or deformation of holding element 50, as might be caused, for example, by the weight of part 170. Alternately, a leveling mechanism or a level (i.e., a device for establishing a horizontal line or plane, as by laser alignment or use of a bubble in liquid) may be attached to each holding element to ensure that any deviation from the desired horizontal plane is tolerable. As another alternative, holding element 50 may be secured to guide rail 90 in a manner which limits rotational movement. In still another alternative, holding element 50 may be rotatably coupled to guide rail 90, and the rotational position of holding element 50 may be controlled. Excessive rotation or deformation of a holding element may negatively affect the position or part-to-part uniformity of the position of parts or part stacks. What is excessive will depend upon the equipment, the characteristics of the part or part stack, the operation being performed, and the tolerance for variation in the output of the particular operation. In some embodiments, lower arm 80 does not touch the surface of manufacturing station 180 or horizontal support 190. Keeping the part or part stack just above the surface of manufacturing station 180 or horizontal support 190 may reduce noise from the interaction of lower arm 80 and manufacturing station 180 or horizontal support 190, and/or may improve control and/or flexibility of the process. For example, if manufacturing station 180 is a stitching station, contacting lower arm 80 with horizontal surface 190 may limit the space (height) available for performing the stitching operation and/or contribute to the formation of wrinkles in the part or part stack. Multi-axis robotic arm 150 may be used to move material handling system 10, engaged with part 170, to other manufacturing and/or inspection stations (not shown), essentially making the combination of multi-axis robotic arm 150 and material handling system 10 a conveying system. Alternately, a specific multi-axis robotic arm 150 and specific material handling system 10 may be used only with one manufacturing station 180, with a separate conveying system (not shown) used to move part 170 between different manufacturing and/or inspection stations, if multiple stations are used. Alternately, material handling system 10 may remain engaged while part 170 is conveyed to a different station by a separate conveying system.

When material handling system 10 engages part 170, material handling system 10 approaches part 170 with gripping arms 60 in open position 130, disposing part 170 between opposing upper arm 70 and lower arm 80. Gripping arms 60 are moved to closed position 140 to secure part 170 in holding elements 50. First holding element 100 is then spaced apart from second holding element 110, which may be accomplished by moving first holding element 100 away from second holding element 110, moving second holding element 110 away from first holding element 100, or moving first holding element 100 and second holding element 110 away from each other. Moving the first and second holding elements increases the tension in part 170, which helps to avoid malfunctions at manufacturing and inspection stations. For example, lateral tension generated by the holding elements on a part or part stack provides resistive forces to frictional adhesion between the part or part stack and a needle penetrating the part during a stitching operation. As another example, the lateral tension may help to prevent the part or part stack from folding, gathering, or otherwise moving in a manner that could cause the part to appear defective at a visual inspection station, or could cause malfunction in further processing steps (e.g., stitching through a folded-under layer that is not supposed to be included in a particular stitching path). Gripping arms 60 may move toward one another in a direction orthogonal to the holding element path, which would reduce the effect of gripping arms 60 on the lateral tension in part 170, allowing for easier and better control of the lateral tension in part 170 using the holding element path.

Material handling system 10 disengages from part 170 by moving upper arm 70 and lower arm 80 apart from one another to open position 130, or until part 170 falls, slides, or can be pulled or otherwise removed from gripping arms 60. Gripping arms 60 may return fully to open position 130, or may open to a position intermediate of open position 130 and closed position 140. In some instances, it may be desirable to move holding elements 100, 110 toward one another to alleviate or fully release any lateral tension in part 170 prior to opening gripping arms 60. Material handling system 10 may partially disengage from part 170 by opening gripping arms 60 such that part 170 remains disposed between upper arm 70 and lower arm 80, but can be moved or repositioned relative to gripping arms 60.

The system has been described with regard to the automated assembly and stitching of shoe parts. The types of shoes which can be assembled using a material handling system as described are expansive, including, without limitation, running shoes, dance shoes, basketball shoes, American football shoes, soccer shoes, cross-training shoes, baseball shoes, golf shoes, skateboard shoes, snowboard shoes, tennis shoes, studio wrap shoes, and street shoes. The stitching involved may be functional or aesthetic or both. The stitching may be done as a single manufacturing operation, or as two or more manufacturing operations. For example, part of a shoe upper assembly may be stitched at one manufacturing station in one operation, and another part of a shoe upper assembly may be stitched at another manufacturing station in a separate operation. As other examples, functional stitching may occur at a separate station from aesthetic stitching, or functional and/or aesthetic stitching using different kinds of stitching or thread may occur at separate stations or as separate operations.

Shoe parts may be comprised of a single part or of a plurality of assembled parts. For example, shoe parts may be comprised of one or more layers of material, such as leather, polymers, textiles, rubber, foam, mesh, TPU (thermoplastic polyurethane), or combinations thereof. Moreover, shoe parts may have a variety of characteristics or combinations of characteristics, such as rigid, malleable, porous, non-porous, etc. Shoe parts may comprise a pre-laminated composition, such as a hot melt adhesive, that facilitates adherence of one part to another part during assembly, such as prior to stitching. In one exemplary aspect, the shoe parts represent different pieces of a shoe upper that are to be assembled prior to molding the shoe upper for attachment to other shoe parts. The shapes and combinations depicted and described herein are merely exemplary.

A material handling system may be useful, for example, in a larger system for the automated assembly and stitching of shoe parts. A system for the automated assembly and stitching of shoe parts may include one or more manufacturing stations, one or more conveyance systems, and/or one or more visual inspections systems. Selected stations or systems that make up a system for the automated assembly and stitching of shoe parts ("automated shoe assembly system") may involve manual operations, however, at least some of the stations or systems are automated. In some automated shoe assembly systems, all substations and sub-systems are automated. An automated shoe assembly system may comprise processes for the manufacture of a complete shoe, or may comprise processes for the assembly of part of a shoe, such as a shoe upper assembly, or may comprise processes for the assembly of a sub-part of a part of a shoe, such as the toe cap and vamp, or the upper, or other combinations of a toe cap (or toe box), vamp, upper, eyelets (or alternative fastener), and the like. An automated shoe assembly system may prepare a single, unitary part for later assembly into a shoe sub-assembly or complete shoe. For example, a unitary shoe upper assembly or a portion of a shoe upper assembly may be stitched for functional and/or aesthetic purposes before it is joined to other shoe parts.

Manufacturing stations may be configured to perform discrete tasks, e.g., cutting a shoe part from a raw material stream, or may be configured to perform a combination of tasks, e.g., cutting a shoe part from a raw material stream and applying an adhesive to the shoe part. Exemplary manufacturing stations may provide raw materials; cut, shape, or form a part from a raw material; stack or otherwise temporarily assemble parts; and/or join discrete parts together to form a complete shoe, a shoe component assembly, or a new part having two or more sub-parts. These are merely examples, and it is neither necessary to include all of these exemplary stations nor are possible stations limited to these examples. In some systems, manufacturing stations may be present but unused in the manufacture of certain shoes. For example, an adhesive applying station may be used when assembling one type of shoe part, and the adhesive applying station may not be used when assembling a different type of shoe part. The assembly of different shoe parts may use different manufacturing stations, or may use the same or a subset of the same manufacturing stations in a different order.

Conveyance systems may comprise any suitable part-moving apparatus, including, without limitation, robotic arms, conveyors, motor-driven turntables, X-Y planar movement tables, X-Y-Z spatial movement tables, or combinations thereof. A conveyance system includes a pick-up tool, which may comprise or consist of a material handling system. Alternately or in addition to the material handling system, a conveyance system may comprise or consist of a grasping tool(s), a scooping tool(s), an electrostatic-based tool(s), an air-displacement or "vacuum"-based tool(s), or combinations thereof. An exemplary conveyance system is described, for example, in U.S. Patent Publication No. 2013/0127193 A1.

Conveyance systems retrieve and relocate parts or part stacks, individually or in groups of 2 or more parts or part stacks, through different elements of the automated shoe assembly system. For example, a conveyance system may retrieve a part or part stack from a manufacturing station that formed or modified the part or part stack, or from a visual inspection station, and deliver the part or part stack to another manufacturing or visual inspection station. A visual inspection station may be configured for manual inspection (e.g., by the unaided human eye, or with the aid of a loupe; magnifying glass; light; light filter; imaging system, including still or video cameras and charge-coupled devices; or combinations thereof) or for automated inspection (i.e., an inspection conducted without human intervention, as by computer analysis of a digital photograph and comparison to a specification). An automated shoe assembly system may comprise more than one visual inspection station, and the visual inspection station(s) may be manual, automated, or, if more than one station is present, a combination thereof. A visual inspection station may be used to detect the presence, position, orientation, size, and/or shape of a part or part stack. The position and/or orientation of the part or part stack may be assessed relative to a conveyance system, a manufacturing station, a material handling system, another part or part stack, or components or combinations thereof.

Information from a visual inspection system may be used to discontinue processing of a part or part stack that is irreparably out of specification, or to alter the further processing of a part or part stack that is out of specification. For example, information from a visual inspection system may be fed, manually or automatically, to a stitching operation at a manufacturing station, allowing for modification of the stitching pattern to account for mispositioning or other recoverable defects. As an example, a representation of a part or part stack may be compared, by a vision system with or without the aid of a computer, with a default or preset stitching pattern. The default stitching pattern may be virtually (e.g., digitally) overlaid (e.g., projected) on the representation of the actual part or part stack, allowing the computer and/or vision system to determine that the preset stitching pattern would result in an offset of at least one stitch outside of acceptable variation. Stated differently, if the preset stitching pattern deviates from a desired relative location on the part or part stack (e.g., proximity to an edge or an overlapping location), the preset stitching pattern is determined to require alteration. The computing system and/or vision system may generate an altered stitching pattern for a particular part or part stack, and the altered stitching pattern may be deployed or associated with and maintained in memory (e.g., in a PLC or alternate computing system) for later use. Alternately, the computing system and/or vision system may generate an altered path or activity for a conveyance mechanism to adjust for the variation in the part or part stack.

In the context of shoe manufacturing, a computing device may be used to determine operations of various shoe-manufacturing tools. For example, a computing device may be used to control a part pick-up tool or a conveyor that transfers shoe parts from one location to another. In addition, a computing device may be used to control a part-attachment tool that attaches (e.g., adheres, stitches, etc.) one shoe part to another shoe part.

Figure 6:
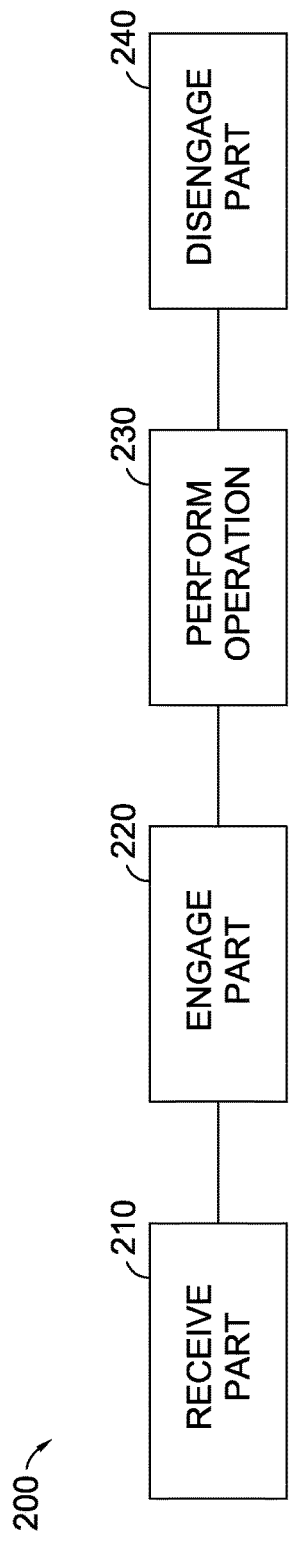
FIGS. 6-7 are flow charts illustrating exemplary methods using a material handling system.
Figure 7:
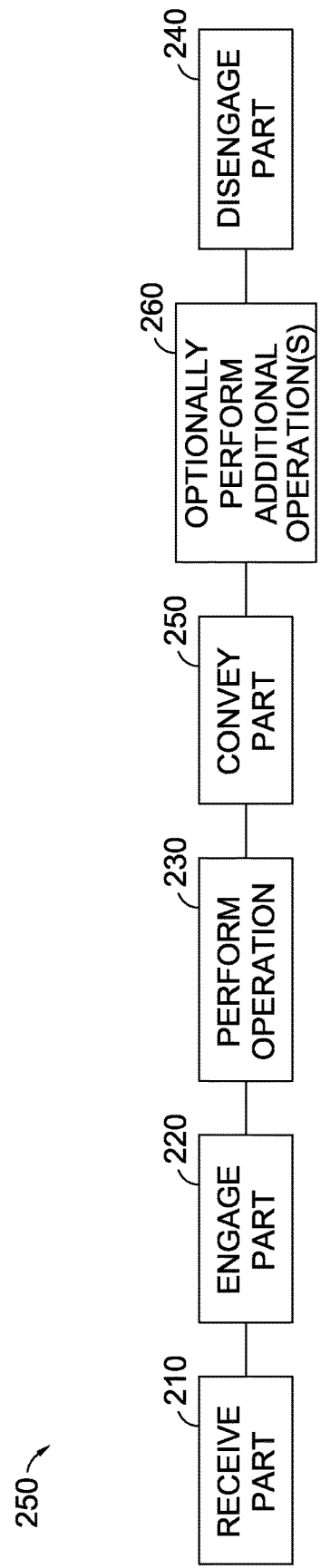

FIGS. 6 and 7 are flow charts for exemplary methods of manufacturing a shoe using a material handling system. FIG. 6 shows a method 200 comprising the receiving 210 a part or part stack, which may occur at a staging area, a prior manufacturing station, a conveyance system, or a visual inspection station. The part or part stack is engaged 220 by the material handling system at a manufacturing or visual inspection station, or is engaged 220 and conveyed to a manufacturing station or visual inspection station. An operation—e.g., an assembly step, a conveyance step, or a visual inspection—is performed 230 on the part or part stack. Optionally, the material handling system may disengage, or disengage and re-engage, the part or part stack during the performance of the operation (not shown). Upon completion of the operation, the material handling system may disengage 240 from the part or part stack. FIG. 7 illustrates the modification 250 of the method of FIG. 6 by the optional addition of one or more additional operation(s) 260 prior to the material handling system disengaging 240 from the part or part stack. Additional operation(s) 260 may include additional conveyance between manufacturing stations (not shown). As in the method of FIG. 6, the material handling system may optionally disengage, or disengage and re-engage, the part or part stack during the performance of any or all of the additional operation(s) (not shown).

Many different arrangements of the various components depicted, as well as components not shown, are possible without departing from the scope of the claims below. Exemplary aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated to be within the scope of the claims.

What is claimed is:

1. A method of manufacturing a shoe, the method comprising:
engaging a part or part stack using a material handling system, wherein engaging the part or part stack comprises a first holding element and a second holding element securing the part or part stack followed by spacing the first holding element apart from the second holding element;
performing an assembly operation on the part or part stack at a manufacturing station; and
disengaging the part or part stack from the material handling system by releasing the part or part stack from the first and second holding elements.

2. The method of claim 1, wherein the assembly operation comprises one or more of riveting, adhesive bonding, cohesive bonding, welding, stapling, or stitching.

3. The method of claim 2, wherein the assembly operation comprises stitching.

4. The method of claim 3, further comprising visually inspecting the part or part stack after the assembly operation.

5. The method of claim 4, wherein the material handling system is engaged with the part or part stack while the part or part stack is visually inspected.

6. The method of claim 5, further comprising moving the part or part stack to a second manufacturing station.

7. The method of claim 6, wherein the material handling system remains engaged with the part or part stack while the part or part stack is moved to a second manufacturing station.

8. The method of claim 1, wherein the first holding element comprises a first gripping element and an opposing, second gripping element, and the first holding element securing the part or part stack comprises disposing the part or part stack between the first gripping element and the second gripping element and moving the first and second gripping elements to closer proximity to one another with the part or part stack disposed between them to secure the part or part stack between the first gripping element and the second gripping element.

9. The method of claim 8, further comprising maintaining a distance between both of the first gripping element and the second gripping element and a horizontal support of the manufacturing station.

10. The method of claim 8, further comprising contacting at least one of the first gripping element and the second gripping element with a horizontal support of the manufacturing station.

11. The method of claim 1, wherein the first holding element is spaced apart from the second holding element by moving the first holding element or the second holding element.

12. The method of claim 1, wherein the first holding element is spaced apart from the second holding element by moving the first holding element and the second holding element.

13. The method of claim 12, wherein the first holding element and the second holding element move equal distances in opposing directions.

14. The method of claim 1, further comprising adjusting the position of at least one of the first holding element and the second holding element.

15. The method of claim 14, wherein a position after adjustment is determined based on the type of shoe.

16. The method of claim 14, wherein a position after adjustment is determined based on the desired tension in the part or part stack.

17. The method of claim 1, wherein the first holding element is spaced apart from the second holding element by linear motion.

18. The method of claim 1, wherein the part or part stack is engaged horizontally by the material handling system.

19. The method of claim 1, further comprising reducing the space between the first holding element and the second holding element after performing the assembly operation.

20. The method of claim 19, further comprising at least partially disengaging the first holding element or the second holding element from the part or part stack.

* * * * *